3,276,901
PROCESS FOR COATING BY SPRAYING A SOLVENT LIQUID AND A DISPERSION OF POLYMER PARTICLES IN A NON-SOLVENT
James Knight Lovell, Slough, and George Harold Cox, London, England, assignors to Imperial Chemical Industries Limited, London, England, a corporation of Great Britain
No Drawing. Filed May 4, 1962, Ser. No. 192,339
Claims priority, application Great Britain, May 10, 1961, 17,002/61
4 Claims. (Cl. 117—105.5)

This invention relates to improved methods of applying coating compositions based on organosols, i.e. dispersions of polymer particles in organic liquid.

One important type of coating composition is the lacquer type, i.e. the type in which a film-forming material is in solution in a volatile solvent, a dry film being produced simply by evaporation of the solvent from a coating of the composition. One disadvantage of lacquers has been the limitation on solids content arising from the fact that solutions of the film-forming material are too viscous for spray application at concentrations above 20–30%. This disadvantage has been overcome by the development of dispersion-type coating compositions in which the film-forming material is present in the coating composition, not in solution but as discrete particles dispersed in the organic liquid. Such dispersions may be free-flowing liquids even when they contain 50% or more film-forming material.

Since the film-forming material is present in the coating compositions as discrete particles there occurs, in the drying of the composition on the article being coated, a critical stage in which the discrete particles coalesce to form an integrated film. Integration may be assisted by the presence in the composition of a plasticiser for the film-forming material. However, the proportion of plasticiser which may be used is limited by the characteristics required in the dry film. It may not be possible to use sufficient plasticiser to promote integration without unduly softening the final dry film.

We have now found that in the spray application of dispersion-type coating compositions film-formation may be assisted if a solvent for the film-forming material is sprayed concurrently with the coating composition.

Several advantages result. The initial effect of the solvent is to promote flow-out of the spray droplets on the article being coated and then, as the solvent attacks them, the particles of film-forming material swell and soften, thus promoting film-integration and reducing any tendency for the coating to run or sag on vertical surfaces. Further, the coated article may be stoved at a lower temperature or, with suitable selection of solvent, will dry at room temperature.

The speed of attack of the solvent in the film-forming material will depend largely on the activity of the solvent and its concentration in the coating. If the solvent tends to act so rapidly as to cause gelation or coagulation before sufficient flow-out has occurred, the proportion used should be reduced, or preferably, it should be sprayed in admixture with a less-active solvent. It can be sprayed in admixture with a non-solvent but then the amount of organic liquid to be evaporated is increased without improvement in the overall solvent attack on the film-forming material.

The solvent is preferably a mixture containing lower-boiling and higher-boiling solvents for the film-forming material. Although the lower-boiling solvent will tend to evaporate sooner it will also tend to attack the film-forming material more quickly, the solvent attack then being followed up by the higher-boiling solvent.

It will be understood, therefore, that the solvent sprayed concurrently with the coating composition may not be one solvent but may be a mixture of solvents or a mixture of solvent and non-solvent.

Solvents for any particular film-forming material will be well known to those skilled in the art. Their suitability will depend on their boiling point and volatility and these characteristics again will be apparent to those skilled in the art of coating compositions.

The proportions to be used will depend on their solvency and volatility characteristics. We have successfully applied the methods of the present invention using solvents as described above in a proportion of from 5% to 25% by weight of the coating composition.

For example, with coating compositions based on dispersion of an acrylate, methacrylate, styrene or vinyl toluene polymer or copolymer, suitable highly-active solvents include ketones such as methyl isobutyl ketone, methyl cyclohexanone, diacetone alcohol, esters such as ethyl, butyl, amyl, and β-ethoxy ethyl acetate, and certain alcohols such as benzyl and furfuryl alcohol.

Suitable solvents of low-activity which may be admixed with highly-active solvent include aromatic hydrocarbons such as xylene and toluene, and terpenes. Suitable non-solvents which may be admixed with highly-active solvents are exemplified by those used in the organic liquid continuous phase of the dispersion.

Suitable solvents of intermediate-activity include terpineol, nonanal and di-isobutyl ketone. Such solvents are conveniently used alone or in admixture with solvents of high activity.

For example, a coating composition comprising a pigmented dispersion of methyl methacrylate/methacrylic acid copolymer in aliphatic hydrocarbon was sprayed concurrently with 10% by weight of a solvent consisting of toluene, methyl isobutyl ketone and methyl cyclohexanone in equal proportions by volume. The spray-coated panel was allowed to stand for 5 minutes and was then heated to 95° C. for 30 minutes. The dry film was hard, smooth and glossy.

The composition and solvent were sprayed concurrently using a standard twin-headed spray gun.

The coated article may be air-dried at room temperature if the composition is sprayed concurrently with 15% of a solvent consisting of toluene, methyl isobutyl ketone, diacetone alcohol and methyl cyclohexanone in equal proportions by weight.

This example is typical of dispersions of polar polymers in relatively non-polar organic liquids. Other polymer dispersions which may be used in this way include those of acrylates and methacrylates of aliphatic alcohols such as ethyl, octyl, lauryl and natural fat alcohols. The preferred polymers for use in coating compositions to be applied by this process are those of methyl methacrylate, β-ethoxy ethyl methacrylate, ethyl acrylate, acrylonitrile, methacrylic acid and acrylic acid, and amides of these acids. Copolymers of these monomers may be used and other typical materials which are suitable for use as comonomers include dimethyl itaconate, diethyl maleate and maleic anhydride.

The invention may, of course, also be applied to coating compositions based on dispersions of non-polar polymer in relatively polar solvent, for example, a composition based on a dispersion of a vinyl toluene/butadiene copolymer in ethyl alcohol. In this case suitable highly-active solvents would include aromatic or chlorinated hydrocarbons, those of intermediate-activity would include higher fatty ketones or esters such as di-isobutyl ketone and amyl acetate and those of low-activity would include acetone and aliphatic hydrocarbons.

As a further preferred feature of the invention the solvent comprises a monomer polymerisable to a polymer compatible with that in the coating composition. The monomer will be a solvent for the disperse polymer of low-, intermediate- or high-activity and as such may be used as described above.

In order to avoid any premature polymerisation of the monomer, catalyst for the polymerisation may be incorporated in the coating composition, or, if a combination of two catalysts is required, one may be incorporated in the coating composition and the other in the solvent.

The additional advantage of this further preferred feature is that the monomer, having assisted in film integration, is not evaporated and lost but is polymerised in the coating. Accordingly, it may be used, if desired, to modify the properties of the disperse polymer.

Because it is not necessary to evaporate the monomer from the coating, it may be used in proportions up to 50% by weight of the coating composition.

For example, a pigmented coating composition comprising a dispersion of methyl methacrylate/ethyl acrylate in aliphatic hydrocarbon/higher ketone was sprayed concurrently with 30% by weight of vinyl toluene. The coating composition contained 0.5% of benzoyl peroxide and the vinyl toluene contained 0.25% of cobalt as cobalt naphthenate. When the two sprays had mixed and coalesced on the article being coated, the vinyl toluene polymerised in the integrated film. After two hours at room temperature the film was hard, dry and glossy.

Other monomers such as methyl methacrylate, methacrylic acid, ethyl acrylate, butyl acrylate and β-ethoxy ethyl methacrylate may be used alone or in admixture.

Styrene is also a suitable monomer but because of its lower solvency is best used in conjunction with a highly-active solvent for the disperse film-forming material.

What we claim is:

1. A process of coating an article by applying a mixed spray of (1) a coating composition comprising a dispersion of discrete particles of polymer in an organic liquid which is not a solvent for said polymer and (2) another liquid which is a solvent for said polymer, the dispersion and solvent being sprayed from separate sources.

2. A process as claimed in claim 1 in which solvent is sprayed in a proportion of from 5–25% by weight of the coating composition.

3. A process as claimed in claim 1 in which the solvent comprises a monomer of a polymer which is compatible with the polymer in said particles, said monomer being sprayed in a proportion of up to 50% by weight of the coating composition and being subsequently polymerised on the coated article.

4. A process as claimed in claim 1 in which the polymer is selected from the group consisting of acrylates and methacrylates.

References Cited by the Applicant

UNITED STATES PATENTS

| 2,575,046 | 11/1951 | Chavannes et al. | 17—63 |
| 2,715,587 | 8/1955 | Armitage et al. | 117—63 |
| 2,813,751 | 11/1957 | Barrett | 117—105.5 |
| 2,901,377 | 8/1959 | Bode | 117—70 |
| 2,934,510 | 4/1960 | Cressey et al. | |
| 3,025,195 | 3/1962 | Kozma | 117—105.5 |
| 3,129,112 | 4/1964 | Marvin | 117—105.5 |

FOREIGN PATENTS

| 607,654 | 10/1960 | Canada. |
| 837,455 | 6/1960 | Great Britain. |

ALFRED L. LEAVITT, *Primary Examiner.*

RICHARD D. NEVIUS, MURRAY KATZ, *Examiners.*

R. E. ZIMMERMAN, A. ROSENSTEIN,
*Assistant Examiners.*